(12) United States Patent
Marshall

(10) Patent No.: US 8,376,648 B2
(45) Date of Patent: Feb. 19, 2013

(54) ROTATIONAL BEARING ASSEMBLY

(75) Inventor: Luke Marshall, Bristol (GB)

(73) Assignee: Rolls-Royce PLC, London (GB)

( * ) Notice: Subject to any disclaimer, the term of this patent is extended or adjusted under 35 U.S.C. 154(b) by 327 days.

(21) Appl. No.: 12/588,290

(22) Filed: Oct. 9, 2009

(65) Prior Publication Data

US 2010/0150646 A1   Jun. 17, 2010

(30) Foreign Application Priority Data

Dec. 17, 2008 (GB) .................................. 0822972.6

(51) Int. Cl.
*F16D 3/00* (2006.01)

(52) U.S. Cl. ........................................................ 403/161

(58) Field of Classification Search .................. 403/150, 403/153, 156, 157, 158, 161, 162, 163, 192, 403/193, 194, 200, 201, 240, 243, 320, 365, 403/367, 368, 370
See application file for complete search history.

(56) References Cited

U.S. PATENT DOCUMENTS

| | | | | |
|---|---|---|---|---|
| 3,152,846 A * | 10/1964 | Dumpis | | 384/220 |
| 4,398,862 A * | 8/1983 | Schroeder | | 414/723 |
| 4,863,329 A * | 9/1989 | Wilson | | 411/339 |
| 5,211,537 A * | 5/1993 | Langston et al. | | 415/209.2 |
| 6,102,610 A * | 8/2000 | Palusis et al. | | 403/388 |
| 6,808,333 B2 * | 10/2004 | Friesen et al. | | 403/158 |
| 2004/0086325 A1 | 5/2004 | Friesen et al. | | |
| 2007/0192993 A1 | 8/2007 | Selle | | |

* cited by examiner

*Primary Examiner* — Michael P Ferguson
*Assistant Examiner* — Daniel Wiley
(74) *Attorney, Agent, or Firm* — Oliff & Berridge, PLC

(57) ABSTRACT

The present invention relates to a rotational bearing assembly including a pivot pin and a rotation member having an aperture within which the pivot pin is located such that the rotation member can rotate relative to the pivot pin. A bearing is at least partially disposed between the pivot pin and rotation member. The bearing has an axial portion which extends axially within the aperture of the rotation member and at least partly over the pin, and first and second flanges which extend at least partly over upper and lower edges of the aperture.

5 Claims, 5 Drawing Sheets

US 8,376,648 B2

ROTATIONAL BEARING ASSEMBLY

The present invention relates to a rotation mechanism, and is concerned particularly, though not exclusively, with a rotation mechanism in which a rotation member, such as a lever arm or the like, rotates relative to a pivot pin.

Many engineering situations require relative movement between a rotational member, such as a lever arm or a rotating disc, and a fixed member. For example, in the compressor section of a helicopter engine, lever arms located on external brackets fitted to the compressor case rotate about fixed pins in order to set the angle of the stator blades.

Figure 1:
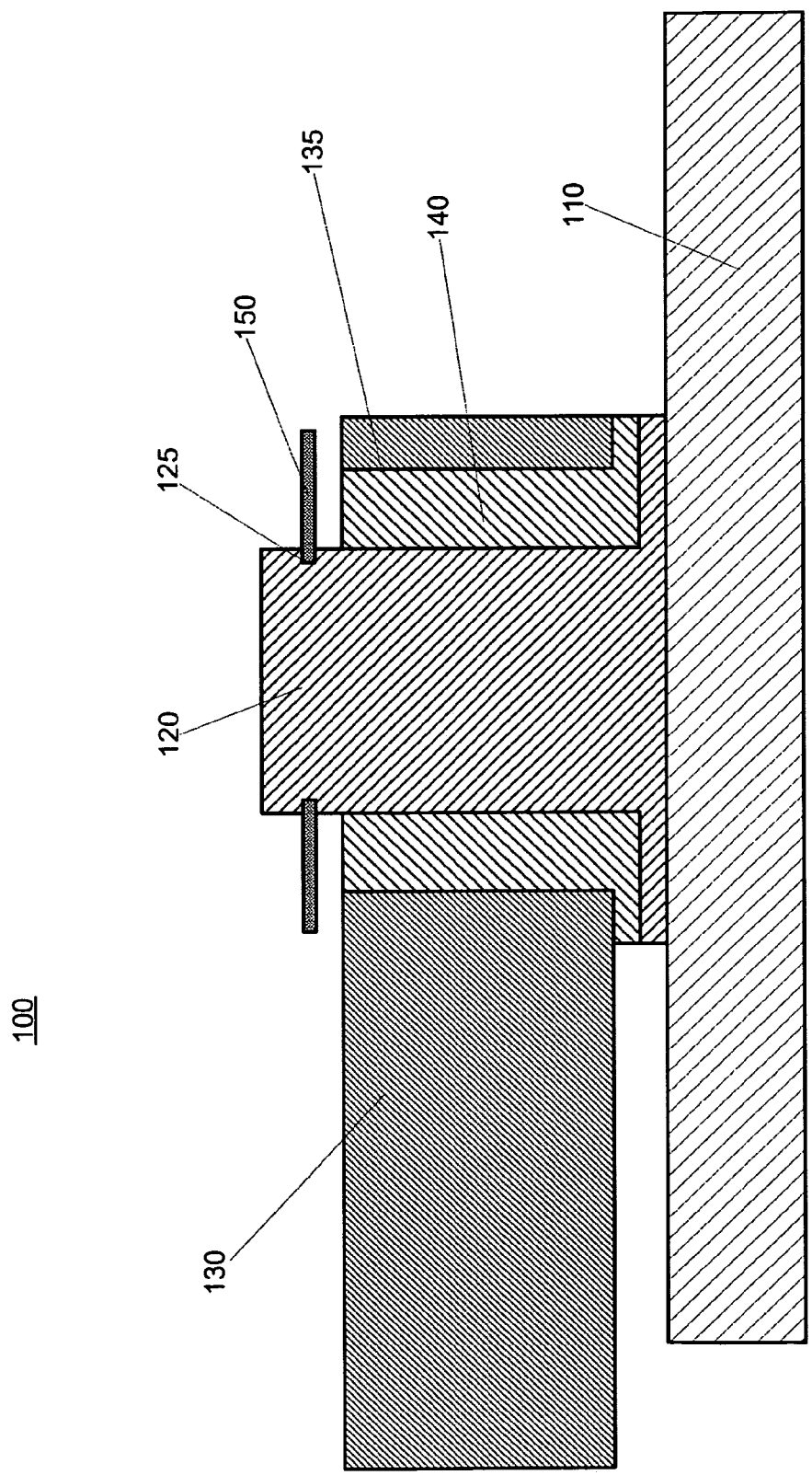

FIG. 1 shows a previously considered rotation mechanism 100 for use in such a case in which a fixed pivot pin 120 is attached to a bracket 110 and a lever arm 130 having a cylindrical bearing surface 135, is arranged to rotate about the pivot pin 120. A phosphor bush 140 is disposed between the lever arm surface 135 and the pivot pin 120. In order to prevent the phosphor bush 140 and lever arm 130 from becoming detached from the pivot pin 120, the pivot pin 120 is provided with a circumferential groove 125 towards its upper end within which a circlip 150 is located.

One disadvantage with the above construction is that it is possible for dirt to become located in between the separate parts. This can include between the lever arm and the phosphor bush, between the phosphor bush and the pivot pin, and under and around the circlip. This can cause seizure of the lever arm. Additionally, relative rotation between metal parts, such as between the end of the phosphor bush and the pivot pin, can lead to eventual seizure.

Furthermore, any axial force on the circlip can cause it to become dislodged from the groove on the pin. This is obviously undesirable since it can allow the phosphor bush and lever arm to become detached from the pivot pin.

The present invention has been devised with these problems in mind.

According to an aspect of the present invention there is provided a rotational bearing assembly comprising a pivot pin and a rotation member having an aperture within which the pivot pin is located such that the rotation member can rotate relative to the pivot pin and a bearing at least partially disposed between the pivot pin and rotation member wherein the bearing has an axial portion which extends axially within the aperture of the rotation member and at least partly over the pin and first and second flanges which extend at least partly over upper and lower edges of the aperture.

The bearing may comprise two distinct bearing members spaced axially on the pin, one inverted with respect to the other, wherein each bearing member comprises an axial portion comprising a bore arranged to receive a portion of the pin, and one of the first and second flanges comprising inner and outer annular surfaces with respect to the rotation member. At least one surface of the axial portion and at least one surface of at least one of the flanges may be a friction-reducing surface. Preferably each bearing member has an inner cylindrical bore surface and an outer annular surface which are friction reducing surfaces.

The bearing may be rotationally fixed with respect to the rotation member, and in a preferred arrangement the bearing and rotation member may engage in an interference fit.

The pin may be arranged to threadedly engage an end stop member so as to prevent detachment of the rotation member and/or the bearing from the pin. The end stop member may comprise a bolt arranged to threadedly engage an axial tapped hole in the pin.

According to a second aspect of the present invention there is provided an engine comprising a rotational bearing assembly according to any statement herein.

Figure 2:
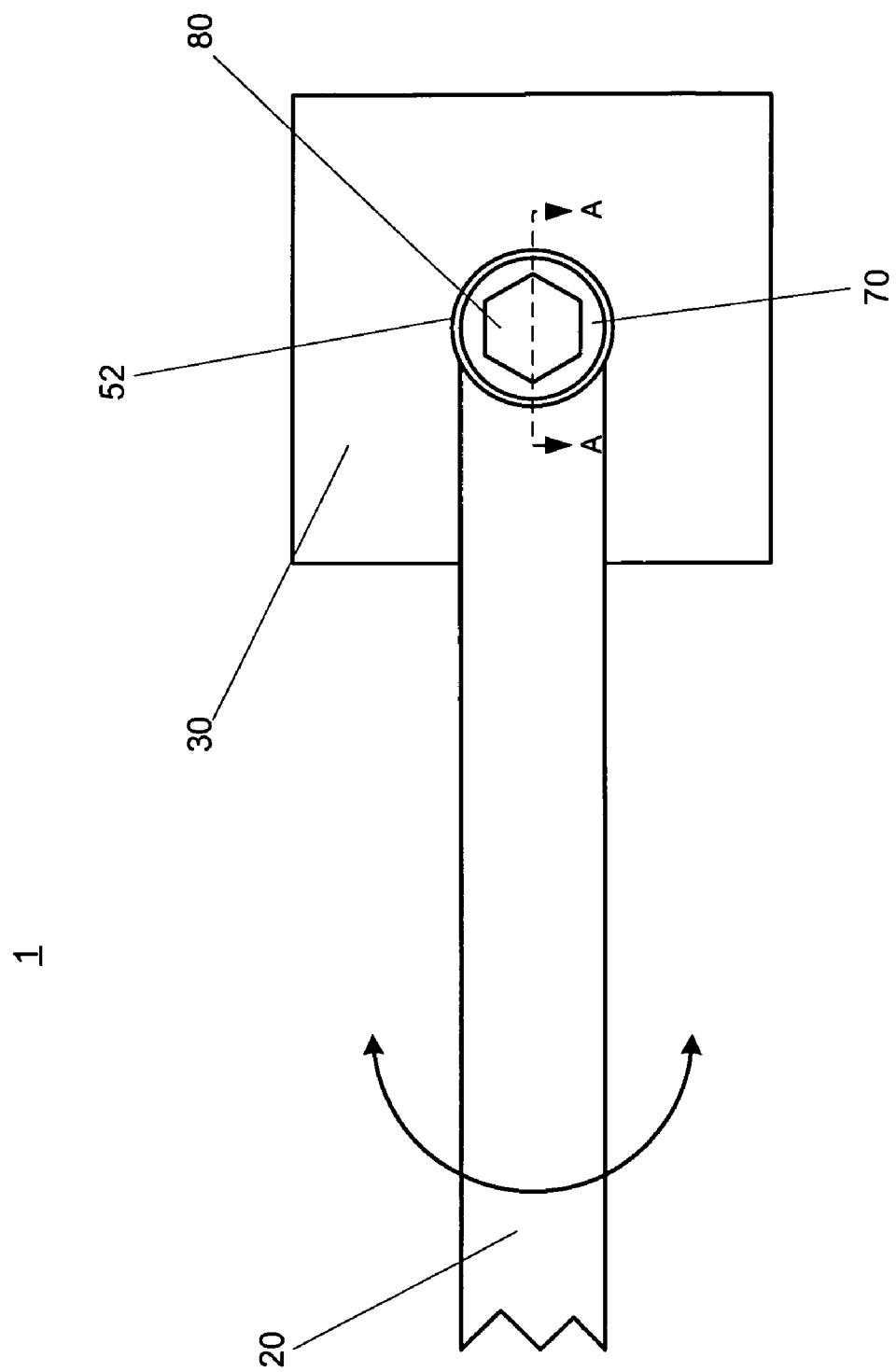
Figure 3:
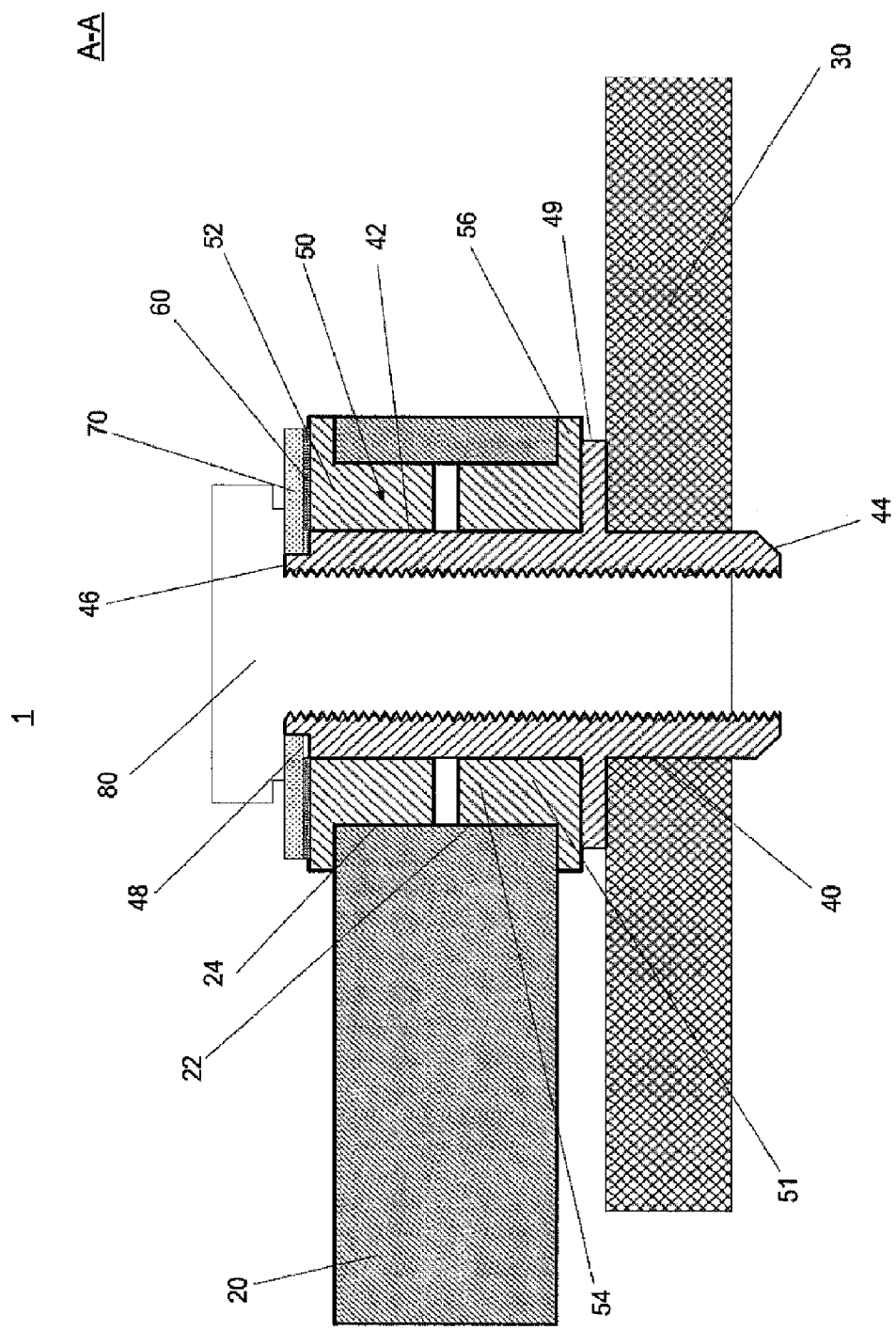
Figure 4A:
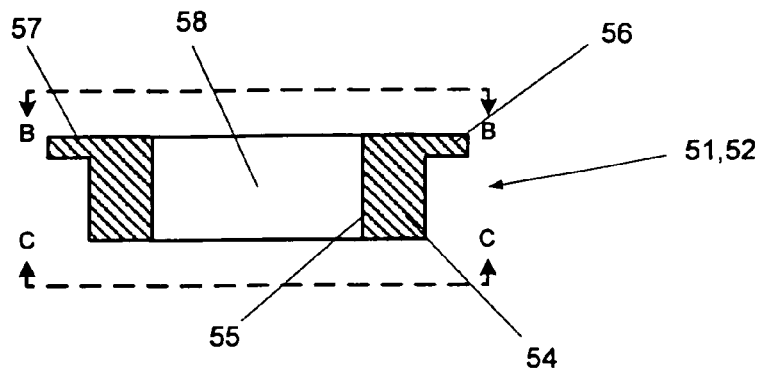
Figure 4B:
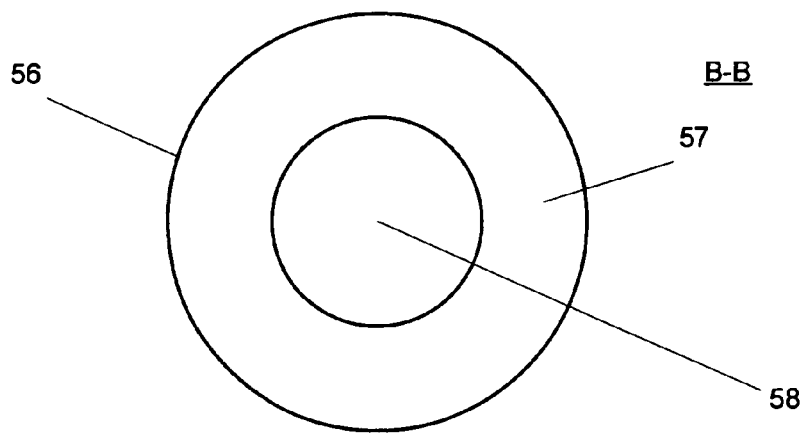
Figure 4C:
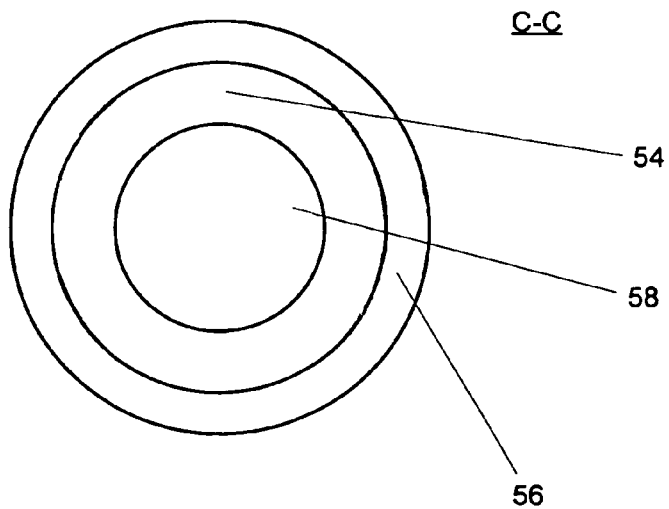
Figure 5:
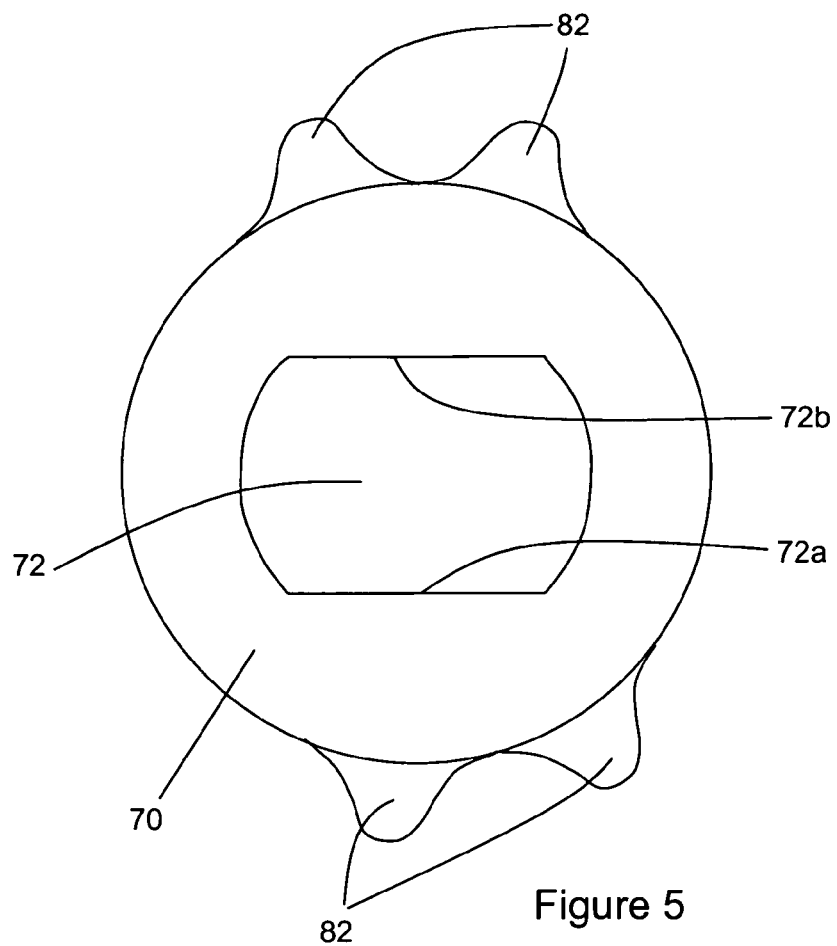

Embodiments of the present invention will now be described, by way of example only, with reference to the accompanying drawings, in which:

FIG. 1 schematically shows a rotation mechanism of the prior art;

FIG. 2 schematically shows a plan view of a rotational bearing assembly according to an embodiment of the invention;

FIG. 3 schematically shows a cross-sectional view of the assembly of FIG. 2;

FIGS. 4A-C schematically show the flanged journal bearing shown in FIG. 3;

FIG. 5 schematically shows in plan view a lock washer shown in FIG. 3; and

Figure 6:
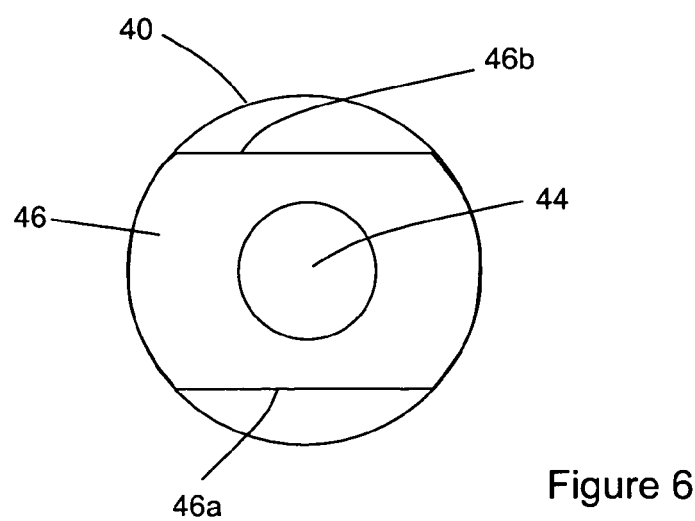

FIG. 6 schematically shows a plan view of a pin shown in FIG. 3.

A rotational bearing assembly according to an embodiment of the invention is shown in plan view in FIG. 2. A lever arm 20 is rotatable relative to a bracket 30 by pivoting about a pivot pin (not shown) fixed to the bracket.

FIG. 3 is the cross-sectional view along A-A of FIG. 2.

Referring both to FIG. 2 and FIG. 3, the bracket 30 is provided with a fixed pivot pin 40 which is located within an aperture 22 in the lever arm 20. A bearing 50 is disposed between the inner surface 24 of the aperture 22 and the outer surface 42 of the pivot pin. The pivot pin 40 has an axial tapped hole 44 at its centre into which a bolt 80 is threaded. A circumferential slot or recess 48 is provided towards the upper end of the pivot pin. This recess provides space for a lock washer 70 that prevents the bolt 80 from becoming loose, and a shim washer 60 that fills the gap between the lock washer 70 and the bearing 50. The bolt is tightened down onto the top 46 of the pivot pin 40 to a predefined torque. The bolt 80 provides a fixing which prevents the lever arm 20 and bearing 50 from becoming detached from the pivot pin 40.

In this embodiment the bearing 50 comprises upper and lower flanged journal bearing members 51, 52 (hereinafter referred to simply as journal bearings). As can be seen from FIG. 3, the two flanged journal bearings 51, 52 are identical but one is in an inverted orientation with respect to the other.

FIGS. 4A, 4B and 4C are more detailed views of one of the flanged journal bearings 51, 52, with FIG. 4A being a cross-sectional view of the bearing, and FIGS. 4B and 4C showing the same bearing respectively from B-B and C-C of FIG. 4A. Each flanged journal bearing 51, 52 comprises an axial portion 54 and a flange portion 56. The flange portion 56 presents an annular surface 57 when viewed in the direction B-B as shown in FIG. 4B. A cylindrical bore 58 is provided through the axial portion. The outer surface of the axial portion 54 is cylindrical. The flanged journal bearing 51, 52 may, in a preferred arrangement, be made from corrosion resistant steel with a polymer/synthetic coating bonded to the surface. The inner cylindrical surface (or race) 55 of the aperture 58 and the annular end surface 57 of the flange 56 are coated in a friction reducing coating, such as a layer of PTFE. However, other friction reducing coatings may be used such as dry film lubricants (DFL).

The diameter of the pivot pin 40 is slightly smaller than that of the bore 58 of the journal bearing 51, 52. This means that when the pivot pin 40 is located within the aperture 58 of the journal bearing 51, 52 they can rotate freely with respect to one another, the PTFE coating on the inside surface 55 of the aperture 58 providing lubrication.

From FIG. 3 it can be seen that the pivot pin 40 is also provided with an annular flange 49 which rests against the bracket 30. The flange 56 of the lower journal bearing 51 is adjacent to, and rests against, the flange 49 of the pivot pin 40. The PTFE coating on the outer annular surface 57 of the flange 56 of the lower journal bearing 51 allows free rotation of the flange 56 on the pivot pin 40.

FIG. 5 shows a non-circular aperture 72 provided in the lock washer 70 which corresponds to the shape of the top 46 of the pivot pin 40, where the top 46 also has a non-cylindrical cross section, as shown in FIG. 6. The lock washer aperture 72 has two flat faces 72a, 72b, which correspond to two rectangular faces 46a and 46b of the top 46. Tabs 82 extend from the perimeter of the washer 70, which in use are bent to engage with flats of the head of bolt 80. As a result, when the top 46 is located within the lock washer 70, the lock washer 70 prevents relative rotation between the bolt 80 and pin 40 and thus prevents the bolt 80 from becoming loose.

Referring to FIGS. 2 and 3, the rotation mechanism 1 is assembled as follows. The lower flanged journal bearing 51 is placed over the pivot pin 40 so that the outer annular surface 57 of the flange 56 rests upon the flange 49 of the pivot pin 40 and the pivot pin 40 is located within the bore 58 of the lower flanged journal bearing 51. The lever arm 20 is placed over the pivot pin 40 and the lower flanged journal bearing 51 so that the axial portion 54 of the flanged journal bearing 51 is located within the aperture 22 of the lever arm and a lower surface of the lever arm 20 rests upon the inner annular surface of the flange 56 of the lower flanged journal bearing 51. The upper flanged journal bearing 52 is placed over the pivot pin 40 so that the axial portion 54 of the upper flanged journal bearing 52 is located within the aperture 22 of the lever arm, the pivot pin 40 is located within the bore 58 of the upper flanged journal bearing 52 and the inner annular surface of the flange 56 of the upper flanged journal bearing 52 comes to rest upon an upper surface of the lever arm 20. A shim washer 60 and then a lock washer 70 are placed over the protruding end 46 of the pivot pin 40. The shim washer fills the gap between the lock washer 70 and the flange 56 of the upper flanged journal bearing 52. A bolt 80 is threaded tightly into the tapped hole 44 in the pivot pin 40 so that it rests against the end 46 of the pivot pin. The bolt 80 is tightened to a predetermined torque.

In use, the lever arm 20 can rotate relative to the bracket 30 about the pivot pin 40. The two flanged journal bearings 51, 52 are interference fitted to the lever arm 20 and therefore rotate with the lever arm relative to the bracket 30 about the pivot pin 40, the suitably lubricated annular and cylindrical surfaces allowing for free rotation. The lock washer 70 and shim washer 60 are fixed rotationally with respect to the pin. The two flanged journal bearings 51, 52 provide a tight seal against the lever arm 20. In particular, there is a negligible gap between the flanges 56 of the upper and lower journal bearings 51, 52 and the lever arm 20. Also, since the upper and lower flanged journal bearings 52 are interference fitted to the aperture 22 of the lever arm 20, the gap between them is also negligible. The negligible size of the gaps between the bearing 50 and the lever arm 20 helps prevent unwanted ingress of dirt and debris between the two. This helps to prevent seizure of the rotation mechanism.

Additionally, there is no relative movement between the bearing 50 and the lever arm 20. This also helps to prevent seizure of the rotation mechanism.

Small gaps may exist between the inner cylindrical surfaces 55 of the upper and lower flanged journal bearings 51, 52 and the outer cylindrical surface 42 of the pivot pin 40 to allow smooth rotation. However, due to the arrangement of the pin 40, lock washer 70 and shim washer 60 it is not possible for dirt or debris to become lodged between the pivot pin 40 and bearing 50. In particular, there are no gaps under the washers 60, 70 or bolt 80. This helps to prevent seizure.

The invention claimed is:

1. A rotational bearing assembly comprising:
   a pivot pin having a threaded hole extending axially therethrough;
   a rotation member having an upper and lower surface, and an aperture extending from the upper surface to the lower surface within which the pivot pin is located such that the rotation member can rotate relative to the pivot pin;
   an annular bearing comprising an inner bearing surface slidably engaged with an outer surface of the pivot pin, and an outer bearing surface fixedly engaged with the aperture of the rotation member, the annular bearing having:
   an axial portion which extends axially within the aperture of the rotation member and at least partly over the outer surface of the pivot pin, and
   first and second flanges at opposite ends of the axial portion, wherein the first and second flanges each include opposed inner and outer annular surfaces, wherein the inner annular surface of the first flange extends at least partly over the upper surface of the rotation member, and the inner annular surface of the second flange extends at least partially over the lower surface of the rotation member;
   wherein the axial portion of the annular bearing is divided into two distinct bearing members spaced axially on the outer surface of the pivot pin;
   wherein a bolt having a head and a threaded shaft is threadably engaged with the threaded hole in the pivot pin, and the head of the bolt comprises a shoulder defining an inner surface and extending partially over the outer annular surface of one of the flanges; and
   wherein a washer is disposed between the inner surface of the shoulder of the bolt and the outer annular surface of the one of the flanges such that, when assembled, a gap between the outer annular surface of the one of the flanges and the shoulder of the bolt is filled by the washer.

2. The rotational bearing assembly according to claim 1, wherein one of the bearing members is inverted with respect to the other, wherein each bearing member includes part of the axial portion having a bore arranged to receive a portion of the pivot pin.

3. The rotational bearing assembly according to claim 1, wherein the annular bearing and rotation member engage in an interference fit.

4. The rotational bearing assembly according to claim 1, wherein the washer comprises a lock washer provided between the bolt and the pivot pin to prevent relative rotation between the end stop member and the pivot pin.

5. The rotational bearing assembly as claimed in claim 4, wherein the pivot pin is provided with a top having a non-circular cross section, which is arranged in use to cooperatively engage with a non-circular aperture of the lock washer.

* * * * *